Sept. 26, 1939.   G. L. R. DUCELLIER ET AL   2,174,203
SYSTEM FOR PRODUCING A PULSATING CIRCULATION IN
APPARATUS CONTAINING GAS EVOLVING PRODUCTS
Filed March 3, 1938

Patented Sept. 26, 1939

2,174,203

UNITED STATES PATENT OFFICE 2,174,203

SYSTEM FOR PRODUCING A PULSATING CIRCULATION IN APPARATUS CONTAINING GAS EVOLVING PRODUCTS

Gilbert Leon René Ducellier and Marcel Albert Isman, Maison-Carree (Algerie), France Application March 3, 1938, Serial No. 193,812
In France March 3, 1937

4 Claims. (Cl. 137—78)

The present invention has for its object a system which enables a pulsating circulation to be produced in an apparatus containing products which evolve gases.

According to the invention, the products are arranged in a closed chamber so that the pressure of the gaseous atmosphere generated can drive the liquid into a tank located on a higher level; said pressure being abruptly eliminated, when it reaches a predetermined limit, by the action of an automatic valve or like member, thereby enabling the liquid to flow, by gravity, from the tank into the lower chamber. As the valve is automatically closed, the same phenomena recur and so determine a pulsating circulation, the pulsation periods being controlled by the action of the automatic valve.

Figure 1:
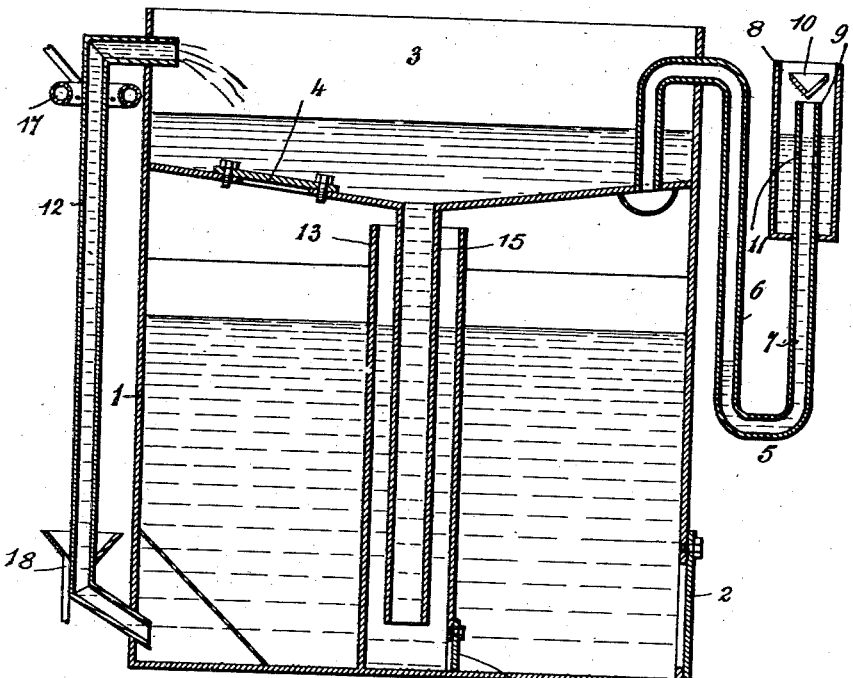
Figure 2:
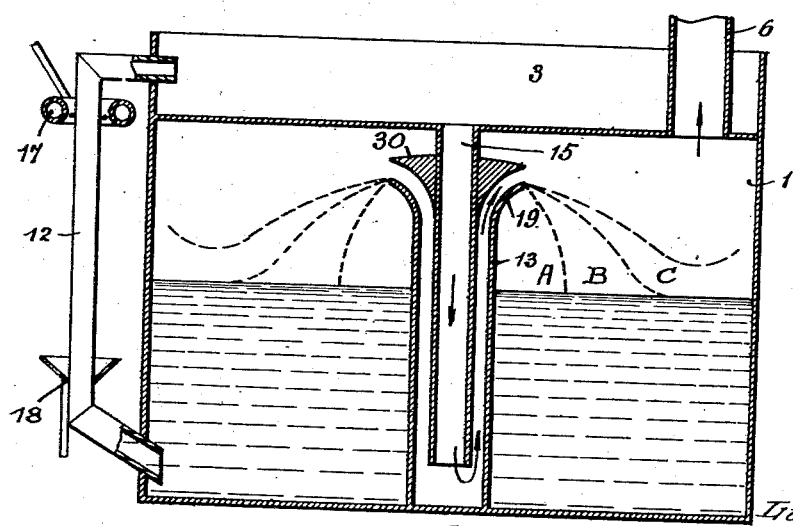

Figures 1 and 2 of the accompanying drawing show diagrammatically and only by way of example, two embodiments of the present invention.

In the embodiment of the invention, which is described hereinafter by way of example only, it has been assumed that the application has been made to a fermentation tank of the closed type 1. Said tank is provided, apart from its normal door 2, (a) With an upper tank or pan 3 communicating with the atmosphere and the content of which may in practice amount to about one third of that of the tank.

(b) With a closure 4 for the upper filling orifice.

Said tank furthermore receives:

(1) A hydraulic valve 5, hereinafter called "small valve", formed by a manometric U-tube having unequal arms, the large arm 6 of which opens into the upper part of the tank, above the substance in the course of fermentation, and the small arm 7 into the middle of a liquid. The latter is contained in a receptacle 8 communicating freely with the atmosphere, and its level is lower than that of the highest point of the large arm when the pressures are equal at the surface of the liquid in both arms. The small arm is extended above the highest level that can be reached by the liquid in the container 8, by a tube 9 itself surmounted by a deflector 10. An orifice 11 places the inside of the small arm of the manometric tube in communication with the lower part of the container 8. The dimensions of said valve will be given hereinafter, after the explanation of the operation of the whole device which is the object of the present invention.

(2) A vertical temperature exchanger 12 which can either cool, or heat the fermenting liquid according to whether said exchanger is supplied with cold water or with hot water; this apparatus placing the lower part of the tank 5 in communication with the upper part of the pan.

The exchange area of this member may be very reduced owing to the large volume of liquid (more than twenty times the content of the tank, in the case of a 10° wine) which passes through it during the fermentation.

By way of indication, said exchanger may be formed by one or a plurality of metal tubes, one face of which is in contact with the fermenting liquid, whereas the other receives for example atomized cold water if the apparatus is used as a cooler.

(3) One or a plurality of manometric U-tubes of large cross-sections, hereinafter called "large valve" placing the lower part of the pan in communication with the upper part of the tank and forming a hydraulic joint.

The length of said tube or tubes should be sufficient to prevent during the fermentation:

(a) The outlet, through said valve, of the gas which accumulates at the upper part of the tank 1.

(b) The liquid from the tank 1 from passing, through said valve, towards the pan 3.

By way of example, this large valve may be formed by two concentric vertical cylinders of large diameter. The larger cylinder 13, which is closed at its base, is provided at that place with a drain plug 14, it emerges at its upper part from the liquid and opens at a small distance from the top of the tank 1. The smaller cylinder 15, which is open at both its ends, and does not extend so low as the former, passes through the top of the tank 1 in a hermetic joint and opens into the pan 3 flush with the bottom.

The small valve may be constructed in a similar manner with straight tubes. The whole of this arrangement operates in the following manner:

The substance to be fermented being, for example, a red grape must with its residue, the tank 1 is filled with said must and the large valve with grape juice. The filling orifice 4 of the tank 1 is hermetically closed. As soon as fermentation starts carbonic-acid gas accumulates and is compressed in the space between the top of the tank and the must in which the residue bathes. A pressure is thus produced above the must, which compels a part of the latter to pass into the pan by way of the temperature exchanger. This circulation lasts up to the instant when, under the influence of the pressure of the gas, the level of the liquid of the small valve in the manometric arm which is in communication with the tank reaches the lowest point. The pressure continuing to increase, as soon as gas begins to escape into the small arm and to emulsify the liquid contained in the latter, the equilibrim in the valve is destroyed and the emulsified liquid is violently ejected. Directed by the deflector 10, said liquid falls into the container 8, whereas the gas compressed in the tank quickly escapes through the passage thus opened. A sudden fall of pressure is thus produced inside the tank 1, which enables the wine contained in the pan 3 to rush into the upper part of the tank through the large valve. Owing to the relative position of the orifices of the large and of the small valve, the phenomenon described hereinafter occurs in the tank. As it leaves the edge of the tube 13, the liquid forms a continuous pouring sheet and the latter, as it meets the surface of the liquid which has remained in the tank, imprisons a certain volume of gas in a kind of bubble. As the gas at the outside of the bubble continues to expand, the gas which is imprisoned on the inside and which is at a higher pressure, tends to lift the liquid sheet, thereby enabling it to reach points in the tank which are further away from the centre. This action lasts until the instant when the sheet reaches the walls and is broken. The production of this phenomenon is considerably enhanced by the presence on the edge of the tube 13 of a deflector which pinches the liquid stream and guides the filaments as they emerge. By adding itself to the effect of the variation of the head of liquid in the pan while it is emptying, said phenomenon enables the entire surface of the tank to be swept by the jet, at least twice at each operation of the device.

The residue is thus perfectly moistened and even disintegrated owing to the violence of the jet obtained by the sudden fall of a very large volume of liquid. At the same time a thorough stirring is produced of the whole fermenting mass.

When the pan 3 is completely emptied, the liquid from the receptacle 8 flows back into the U-shaped tube 9 and closes the small valve again.

The tank 1 has then returned to its original state and as the fermentation continues, gas again accumulates and all the phenomena described recur automatically in the order indicated, and this goes on until the fermentation is completed.

This operation requires that the maximum height which can be reached by the liquid in the small arm 7 of the small valve 5 during the operation be included between two limits. The lower limit corresponds to the pressure of the gas which drives the fermenting liquid into the pan 3, through the temperature exchanger 11, until the desired level is reached in the pan. The upper limit corresponds to the pressure at which the gas begins to escape through the large valve, when the pan is empty. During the filling of the pan, if the surface of this latter is the same as that of the tank, the increases in the pressure of the gas in the tank are exactly balanced by the increasing pressure of the liquid which is in the pan.

The cross-section of the tube 7 must obviously be sufficiently large so that in a given time its output is greater than the production of gas. It is advantageous for such cross-section to be the largest cross-section that is capable of producing the operation of the said valve such as it has been described in such a manner that the elimination of pressure in the tank shall be as sudden as possible.

For the same speed of fermentation, the user can vary at will the frequency of the rises and also the volume of the fermenting liquid each time it has risen.

An annular tube 17 surrounds the upper part of the pipe 12 and is provided with inwardly directed orifices whereby a cooling or heating liquid may be directed against the pipe 12. The part 18 provides a receiving funnel for the discharge of the cooling or heating liquid.

By varying the level of the liquid in the container 8, the adjustment is obtained of the level reach by the fermenting liquid in the pan 3.

This adjustment, like the previous one, acts on the frequency of the opening of the valve 5.

In the example indicated above, it has been stated that the pipe which places the lower part of the tank 1 in communication with the top of the pan 3 serves at will as a cooler or as a heater, but it is obvious that it could be used solely as a circulation pipe, in the rare cases in which it might not appear necessary to modify the temperature of the fermenting liquid.

This description has been made also assuming, for facility of explanation, that the fermenting liquid was grape must, but it is quite obvious that nothing would be changed in the operation of said tank if it were filled with any other fermentable liquid containing or not containing solid substances, for example a sweet juice which does or does not contain beetroot husks or again a liquid dung in which manure is immersed. This enumeration is in no way limitative and constructional modifications may be effected without exceeding the scope of the present invention.

Furthermore, it will be mentioned that the device which is the object of the present invention enables the tanks to be equipped individually, is adaptable to all kinds of tanks, enables large masses of liquid to be brought into play suddenly; its operation is automatic, continuous, absolutely efficient and in addition, totally gratuitous. Another fact which characterizes it is that alone, it indiscriminately ensures the cooling of fermenting liquids or the heating of same as their rising, their thorough and repeated stirring and the perfect exhaustion of the solid materials (for example: grape residue) which they contain, such exhaustion's being moreover enhanced by the violent mechanical action produced by the sudden fall of large liquid masses into the tank.

It is consequently a device which effects, of its own accord and in the most complete manner, all the physical treatments to which the treated material has to be subjected during fermentation.

Its other advantages rest in the fact that:

Its adoption only entails a small installation expenditure, its entirely gratuitous operation only requires, on the other hand, the most reduced supervision, and it is absolutely reliable, since said device, in the embodiment described, does not include any movable mechanical member, such as a valve, ball, lever, float, counterweight, spring, etc. which is capable of getting out of order, and each of its three fixed members alone forms a hydraulic safety valve which is reliable in operation, of large cross-section independent of the two others and opening instantaneously, thereby absolutely preventing any accidental excess of pressure in the tank, even momentarily.

It ensures a perfect cleanliness of the tanks by eliminating all the manipulations which are usually required for effecting the rises and cooling and thereby avoids numerous risks of contaminating the fermentable medium.

It enables more regular fermentations to be obtained, more colour for red wines and also more body and aroma, less volatile acidity, the residue cap being held constantly shielded from the air; a reduction in the losses of alcohol, the operations being shielded from the air and in the cold state and the must which passes into the upper pan being always cold must.

In a general manner it enables products of better quality to be obtained than those which are obtained by grouping, by multiplying, and by combining, in any manner whatsoever, any of the apparatus (pumps, refrigerators, heaters, sprinklers, etc.) which are insufficient and costly, that it is intended to replace.

In order to enable, with the above described embodiment, the return liquid to be projected over the entire surface of the lower tank (in particular, in the case of wine-making, over the entire cap formed by the residue), it is useful to provide, on the outer tube of the large hydraulic valve, a flange 19 and even a device for pinching the liquid stream and formed, for example, by a head 30 (Fig. 2). In this manner, the direct fall of the liquid against the wall of the tube is prevented, while facilitating the formation of a pouring sheet in the shape of a dome. In this figure, the line A is the path of the liquid sheet which is formed at the beginning of the return of the liquid into the lower chamber, through the large hydraulic valve, the lines B and C are the subsequent paths as the gas contained inside the sheet expands. In the latter position C, as the output becomes slower, the edge of the sheet becomes thinner and the internal pressure lifts the liquid screen. The gas can then escape and the pressure under the sheet decreases; said sheet then returns to the starting path A. The same phenomena can recur several times during the emptying of the upper tank.

We claim:

1. An apparatus for producing a pulsating circulation of liquids containing gas evolving products, comprising a closed chamber for receiving the liquid, a tank located at a higher level than the said chamber, means for conducting the liquid from the lower part of the chamber to the upper part of the tank under the pressure of gases generated in the chamber, means for abruptly eliminating said pressure when it reaches a predetermined limit, and means for conducting the liquid from the bottom of the tank to the upper part of the chamber upon elimination of the pressure in the said chamber.

2. An apparatus for producing a pulsating circulation of liquids containing gas evolving products comprising a closed chamber for receiving the liquid, a tank located at a higher level than the said chamber, means for conducting the liquid from the lower part of the chamber to the upper part of the tank under the pressure of gases generated in the chamber, means for abruptly eliminating said pressure when it reaches a predetermined limit, and means for conducting the liquid from the bottom of the tank to the upper part of the chamber upon elimination of the pressure in the said chamber, the last mentioned means comprising a tube leading from the bottom of the tank to the lower part of the chamber and a cylinder fixed on the bottom of the said chamber and surrounding the said tube, the said cylinder being closed at the bottom and having an upper opening communicating with the upper part of the said chamber.

3. A device as claimed in claim 1, wherein the said means for abruptly eliminating the pressure is a hydraulic valve comprising a U-shaped tube receiving a closing liquid, the said U-shaped tube having a longer arm communicating with the upper part of the said chamber and a shorter arm communicating with the atmosphere, the upper part of the said shorter arm having an orifice, and a receptacle surrounding the said upper part of the shorter arm.

4. A device as claimed in claim 2, comprising an outwardly directed flange formed at the open upper end of the said cylinder, and a deflecting member mounted above the said open upper end and forming with the said flange an outwardly directed annular nozzle.

GILBERT LEON RENÉ DUCELLIER.
MARCEL ALBERT ISMAN.